United States Patent [19]

Hsieh

[11] 3,882,959

[45] May 13, 1975

[54] SAFETY DEVICE FOR CAR BRAKE SYSTEM

[75] Inventor: Ching-Chang Hsieh, Taipei, China /Taiwan

[73] Assignee: Safety Drive Industrial Co., Ltd., Taipei, China /Taiwan

[22] Filed: Apr. 30, 1973

[21] Appl. No.: 355,709

[52] U.S. Cl. ............ 180/114; 137/614.17; 188/1 A; 251/137; 251/139; 303/89; 340/52 C
[51] Int. Cl. ............................................. B60r 25/08
[58] Field of Search ....... 180/114; 303/89; 188/265, 188/1 A; 251/137, 139; 137/614.17

[56] References Cited
UNITED STATES PATENTS

| | | | |
|---|---|---|---|
| 1,696,985 | 1/1929 | Trbojevich | 188/1 A |
| 2,771,093 | 11/1956 | Wilson | 137/614.17 |
| 3,185,177 | 5/1965 | Brandenberg et al. | 251/139 X |
| 3,324,889 | 6/1967 | Batts | 251/139 X |
| 3,415,487 | 12/1968 | Robarge | 251/137 |
| 3,420,260 | 1/1969 | Wisniewski | 251/139 X |
| 3,559,755 | 2/1971 | Pond | 303/89 X |
| 3,592,438 | 7/1971 | Greenwood et al. | 251/139 |
| 3,800,279 | 3/1974 | Thompson | 180/114 |

*Primary Examiner*—Kenneth H. Betts

[57] ABSTRACT

An auxiliary safety device for a car brake system comprising an electro-magnetic operated plunger operable to open and close a brake fluid channel by energizing selectively coils having opposite polarities. The safety device can be operated to detect leakage of brake fluid, reinforce braking performance, and protect the car from theft.

9 Claims, 7 Drawing Figures

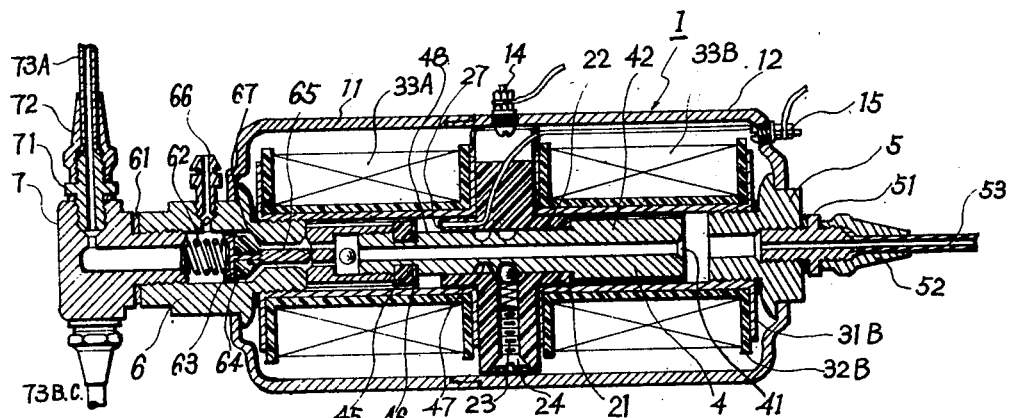
FIG. 1A
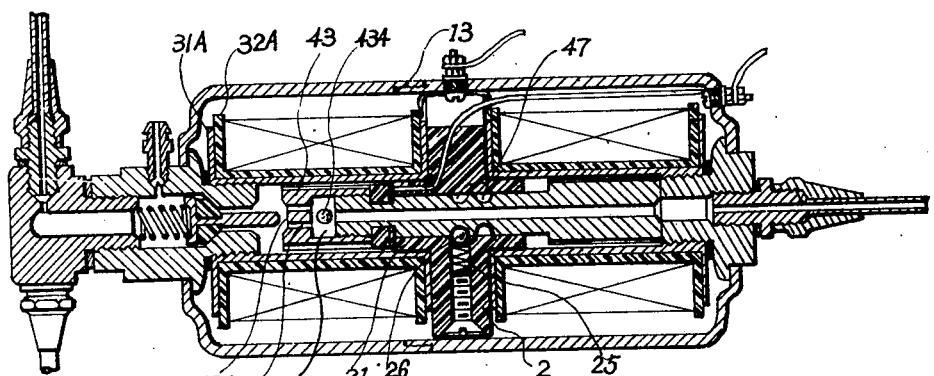
FIG. 1B
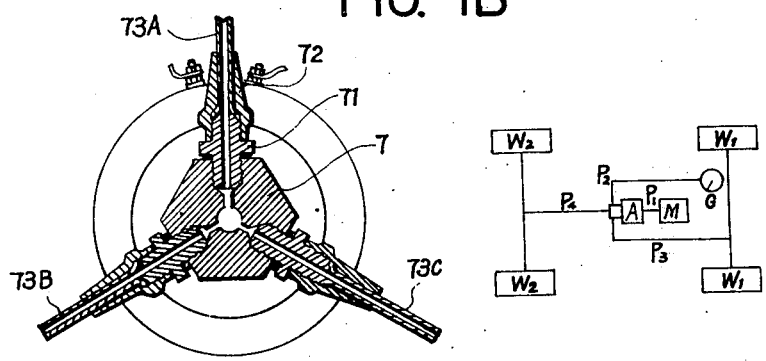
FIG. 2
FIG. 3

SAFETY DEVICE FOR CAR BRAKE SYSTEM

FIELD OF THE INVENTION

The present invention relates generally to safety device for a car brake system, and more particularly to an auxiliary device having a triple effect, namely, to ensure braking efficiency during driving, to indicate the pressure status and detect leakage of brake fluid, and to protect a car from theft during parking.

BACKGROUND OF INVENTION

The conventional auxiliary devices enabling the safeguard of a car brake system have never been able to indicate visually the status of fluid pressure to determine whether a leakage of fluid or loss of pressure is occurring during driving or parking of a car, much less to enforce the braking efficiency especially when a car is required to start in a upgrade position or to stop in a sliding downgrade. Besides, those devices having a theft protective purpose usually utilize the steering wheel or car door as an actuating point by means of mechanical or electrical connections.

During a parking period or during driving, the brake system may develop a leakage without being discovered. It is always too late when there is a road condition requiring braking and suddenly one finds the brake unworkable, whereby both life and property are endangered. Besides, when a car must be started on an upgrade, the driver has to apply the hand brake and then release the hand brake once the car is started and moving. The operation of engaging the engine clutch and releasing of the brake has to be done simultaneously, which would give a difficult time to inexperienced drivers getting a smooth upgrading start without the slightest sliding back of the car. While moving downgrade, the driver sometimes has to apply the brake from time to time to reduce the downgrade speed, thus making the driver nervous. Also, when the car is moving upgrade, the driver may wish to change into a lower gear to increase the climbing force. This operation requires that the foot brake be applied to prevent the tripping off of the engine and sliding backward of the car. In a conventional brake system, it has been not so easy to achieve these purposes.

SUMMARY OF INVENTION

Therefore it is a main object of the present invention to provide an auxiliary device for a fluid pressure brake system to enable visual detection of any leakage of brake fluid.

Another object of the invention is to provide a double checked auxiliary device for a fluid pressure brake system that can not only easily dead lock the brake fluid from back flowing, but also can reinforce the brake power.

A further object of the invention is to protect the car from theft by providing the auxiliary device with hidden lock and release means that would not be easily found.

Other objects and features of the invention will be apparent from the following detailed description to be taken in conjunction with the annexed drawings.

BRIEF DESCRIPTION OF DRAWING

FIGS. 1A and 1B are longitudinal sectional views of a preferred embodiment of the present invention. FIG. 1B shows the lock-up state of the auxiliary safety device for a car brake system while FIG. 1A shows the release state of the device.

FIG. 2 is a cross-sectional view of a three way outlet connection of the said device.

FIG. 3 is a fluid piping diagram showing the connection of the device to an indicating gauge, and to the front and rear wheel system.

DETAILED DESCRIPTION OF PREFERRED EMBODIMENT

Figure 4:
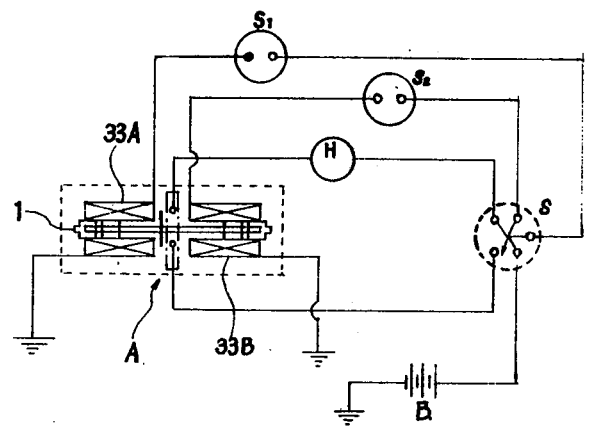
FIG. 4 is an electrical circuit diagram for the device.

Now referring to FIG. 1A, the auxiliary safety device of a preferred embodiment of the invention is shown in a state of release.

The main part of the device is encased in a cylindrical casing 1, which is composed of a left half 11 and right half 12 screwed together at 13. On top of the casing 1, there are a pair of terminals 14—14, and at the end of the right half casing 12, there are another pair of terminals 15—15. The connections of these two pairs of terminals will be described later.

Disposed inside the casing 1, in the middle, is a core member 2 of insulation material which has a flat disc-like body in the center and two projected portions 21 at both sides. Longitudinally passing through the center is an opening 22, through which a plunger 4 is movably mounted. At the lower portion of the disc body of the core member 2, a hole 23 is radially disposed from the edge of the disc toward the opening 22. A ball 26 is provided at the outlet of the hole 23 with a coiled compression spring 25 disposed underneath it. Under the spring 25 an adjustable screw 24 is provided which is accessible through a hole at the bottom of the casing 1. The ball 26 has a left and right position on the plunger 4 by moving into either of the two grooves 47 on the plunger stem 48. On left side projection 21 of the core member 2, an electric contact point 27 is provided which is connected to terminal 14.

Plunger 4 has at its center a stem 48 of smaller diameter mounted slidably inside the opening 22 of the core 2. Plunger 4 also has inlet head 42 and outlet head 43 both of larger diameter than stem 48. Both heads 42 and 43 are slidably mounted inside center holes of a pair of metal spools 31A and 31B which are screwed at one end on the left and right projections 21—21 of the core member 2. The left end of the left spool 31A has inside its center hole screwed with a main outlet 6 which seals up the left end opening of the casing 1. The right end of the right spool has inside its center hole screwed with a main inlet 5 which seals up the right end opening of the casing 1. The details of the main inlet 5 and main outlet 6 will be described later.

The outlet head 43 of the plunger 4 has a cavity 433 in the center with its right opening channeling through a path 41 toward the right end of the inlet head 42. Cavity 433 has a channel 432 leading toward a recess 431 at the left end of the outlet head 43. A ball 434 is provided as a check means within cavity 433. A packing ring 45 and a metal ring 46 are provided between outlet head 43 and stem 48.

Main inlet 5 is connected to an inlet pipe 53 through sockets 51 and 52. Main outlet 6 is connected to a triple outlet distributor 7 through a socket 61. Three outlet pipes 73A, 73B and 73C are connected to the triple outlet distributor 7 through sockets. Outlet pipe 73A is to be connected to a fluid pressure gauge mounted on the driver's panel to give visual indication of the fluid pressure existing in the brake system. Outlet pipe 73B and 73C are connected respectively to the front wheel brake cylinder and rear wheel brake cylinder.

FIG. 3 is a piping diagram of the present device showing M as the master brake cylinder, A the said auxiliary safety device, and A and M connected with pipe $P_1$. The outlet of the device A has pipe $P_2$ leading to a pressure gauge on the driver's panel, pipe $P_3$ leading to the front wheel brake cylinder, and pipe $P_4$ leading to the rear wheel brake cylinder. $W_1$ and $W_2$ depict the front and rear wheels respectively.

A compression coil spring 62 is mounted inside the main outlet 6 with its left end bearing upon the rim of socket 61 and its right end on a retainer 63. Connected to the seat of retainer 63 is a pin seat 64 with pin 65 which is slidable within the narrow entrance 67 of the main outlet 6 and with the pin head sticking outward into the recess 431 at the left end of the outlet head 43.

The metal spools 31A and 31B are lined respectively with spools 32A and 32B of insulation material. Wound on insulation spools 32A and 32B are coils 33A and 33B. Coils 33A and 33B are wound in opposite directions, so that when either of the coils is energized, it will give opposite effect to the plunger 4. In other words, when the coil 33A is energized, the plunger 4 will move to the left position, and the outlet head 43 will touch the right end of the main outlet 6. (See FIG. 1A). When the coil 33B is energized, the plunger 4 will move to the right position, and the inlet head 42 will touch the left end of the main inlet 5. (See FIG. 1B).

FIG. 4 is a wiring diagram of the electrical circuit of the auxiliary safety device. B is a storage battery, and S is the main switch of the engine. $S_1$ is the switch for actuating coil 33A, and may be installed at an out of sight place, such as under the driver's seat, inside glove compartment, or back of the panel board, etc. $S_2$ is the switch for actuating coil 33B, and may be installed at any place as desired. H is the horn.

Figure 5:
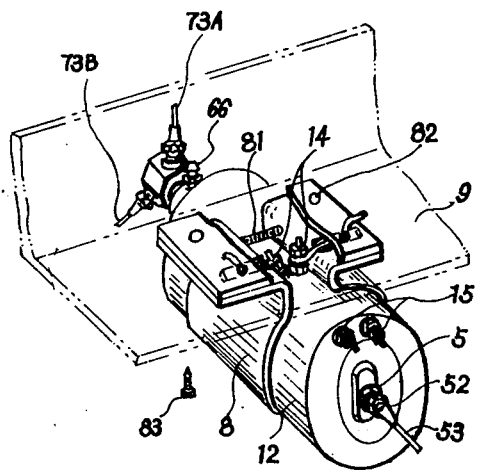
FIG. 5 is a perspective view of the said device in mounting position.

FIG. 5 shows an example of installation of the present device. Bracket 8 is provided for mounting the device under a chassis member with set screws 83 through holes 82 on the bracket. Bracket 8 itself is tightened up with a bolt 81.

Figure 6:
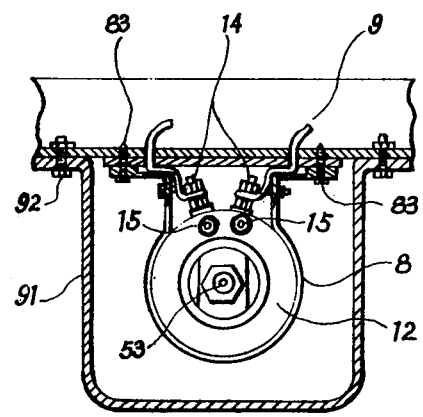
FIG. 6 is an end view of the device showing the said device being enclosed in a protecting hood.

In FIG. 6, the mounted device is shown covered up with a hood 91 through bolt and nut sets 92, to protect it from soil and dust, and also from being stolen.

In the ordinary situation, button switch $S_1$ is on, coil 33A is energized, and plunger 4 is at its left position. Thus, the recess 431 pushes the pin 65 leftward to enable the free channeling of the brake fluid. In this situation, when the brake is applied, the pressurized fluid from the main brake cylinder M passes through pipe $P_1$ and enters into inlet pipe 53 of the present device, through path 41 and into cavity 434, and further through channel 432, and the narrow entrance 67 of the main outlet 6 toward the triple outlet distributor 7. The pressure is passed through pipes $P_2$, $P_3$ and $P_4$, to pressure gauge G on panel, front wheels $W_1$ and rear wheels $W_2$. When the brake is released, fluid returns to the main cylinder M.

In the situation when the car is to be parked, the button switch $S_2$ is pressed and coil 33B is energized, causing plunger 4 to move to the right position, and pin 65 to seal up the narrow entrance 67 of the main outlet 6. Under this condition, when the brake is applied by stepping down the brake pedal to the very bottom, the high pressure of the brake fluid is transmitted through triple distributor to gauge G, front and rear wheels $W_1$ and $W_2$. The car is thus steadily parked, gauge G indicating the highest pressure of brake fluid. By then, even if brake pedal has already been released, the back pressure of the fluid forces the rightward movement of the pin 65 to seal up the narrow entrance 67 of the main outlet 6. In addition, the ball 434 in the cavity 433, would also thrust rightward to seal the path 41. Therefore, the fluid channel is double sealed, and the back flow of the fluid toward main cylinder M is entirely prevented. Unless button switch $S_1$ is pressed to cause the plunger 4 to assume its left position, nobody would be able to drive the car away. (engine would stall when the clutch is engaged). Since button $S_1$ is installed in a hiding place, only the owner of the car knows its whereabouts, and no one is capable of stealing the car. Besides, the horn circuit is closed due to the contact of metal ring 46 and point 27. Once the engine is started, the horn would give out an alarm without stop. The car burglar would be seized with panic and flee away. Even if the horn circuit is cut by the burglar, the car could not be driven away due to the deadlock of the brake system as aforementioned.

When the car owner would like to start the car, he first inspects the pressure reading of the gauge. If the gauge shows the pressure reading as previously left, that means the brake system is in normal condition, and no leakage has ever occurred. If the reading of the gauge drops a little, however still within the safe range, attention should be paid to check the system in the nearest possible future. In case the present device is not provided, one would hardly detect a small leakage or loss of pressure in the fluid system. If the reading of pressure gauge shows a serious leakage, then repair work could be effected in time. Otherwise, if the leakage is only discovered when the car is already on the road, then when a bad road condition shows up, it is always too late, and a car incident would unavoidably happen. The precise prediction of the present device is unachievable with whatever device heretofore existed. In comparison with cars without the present device, the present invention could give a warning some ten days before anything serious happened.

If the reading of the pressure gauge shows normal, then the hidden switch button $S_1$ is pressed to enable the reopening of the fluid channel as in FIG. 1A, to enable the operable condition of the brake system, and the car can be driven away immediately.

During running of the car, the braking action is very sensitive, and needs smaller pedaling force and almost without bouncing back. Especially, when test running, if button $S_2$ is pre-pressed, due to the booster like effect of the present device, in case any uneven adjustment of the brake lining clearance exists, a twist of the braking result would show up. This is another feature of the present device.

Upon running upgrade or downgrade of the car, the present device gives 100% effect of a hand brake. More particularly speaking, when a car is parked upgrade or climbing upgrade, and the driver wishes to change into a lower gear, the hand brake usually has to be applied by hand. The car would slide in most cases. In the case that the present device is provided, there would still be obtained a 100 percent hand braking effect, but no sliding or backward motion would occur. Even when the engine stalls or at the starting of engine, the driver could shift the gear without hurry, and thereafter press button $S_1$ to release the brake and start again for climbing without a hazard.

Car accidents happen frequently during running downgrade, especially when the slope is steep with many turns. With the present device, the fluid channel is first closed by pressing button $S_2$. The brake pedal is then stepped down a little to cause the clearance of the brake shoes opened to about one-third - one-half of the full open condition. The down graded speed may thus be reduced. In case an emergency condition arises, further application of the brake would require shorter time to get the brake shoes full opened, since the shoes were already opened to some extent. This effect gives an increase in driving safety.

Besides, during running of the car, the driver may be aware of the pressure of the brake system through the indication of the pressure gauge G. With the device of the present invention, wheel cylinders of the brake system would work more efficiently, which not only improves the safety condition but also reduces the breakdown of the brake system. During parking, the car is also theft proof.

The present device which serves for the multiple purposes of trouble prediction before driving, giving improved braking effect during running, and ensuring theft proof during parking, is an ideal safety equipment not only for automobiles but also to similar vehicles and machines using a fluid brake system. It is to be understood here, that the word "fluid" should mean to include liquids, gases or liquid-gas systems.

The above embodiment is given only for illustrative purposes and not by way of limitation, and modifications will become evident to those skilled in the art which will fall within the scope of attached claims.

I claim:

1. An auxiliary safety device for a car brake system comprising a center core of insulation material having a hole therethrough, a plunger slidably disposed longitudinally through the core hole, a pair of coils disposed at each side of the said core operable to give opposite polarities, and a main inlet and a main outlet, said coils be adapted to be selectively energized to produce an electromagnet effect to operate the plunger to open or close a brake fluid flow channel which starts from the main inlet and extends through a center path of the plunger toward the main outlet, said device being operable to detect leakage or loss of brake fluid pressure, reinforce brake power, and protect the car from theft.

2. Safety device for a car brake system according to claim 1, wherein the two coils are wound on insulated spools respectively on different sides of the center core, and when energized, give said opposite polarities, a first coil being operable for opening the fluid channel and the second coil being operable for closing of the fluid channel.

3. Safety device for a car brake system according to claim 2, wherein a first switch is provided to energize the first coil and a second switch is provided to energize the second coil.

4. Safety device for a car brake system according to claim 1, wherein the plunger has a center stem of smaller diameter and inlet and outlet heads of larger diameter, the fluid channel passing all the way through from the inlet to outlet heads.

5. Safety device for a car brake system according to claim 1, wherein the main outlet has a spring biased pin to serve as a check to back flow of brake fluid.

6. Safety device for a car brake system according to claim 4, wherein the outlet head has a cavity in its center providing a check to back flow of fluid when the brake is in deadlock position, and there is provided at the end of the outlet head a recess for retaining a further check means including a pin protruding out from the main outlet.

7. Safety device for a car brake system according to claim 4, wherein two grooves are provided on the plunger stem, and a spring biased ball check is provided in the core body to ensure the working positions of the plunger.

8. Safety device for a car brake system according to claim 1, wherein the whole device is encased in a casing having inlet and outlet mains and electric terminals.

9. Safety device for a car brake system according to claim 1, wherein the device is mounted on a car chassis with a bracket and covered with a hood.

* * * * *